United States Patent [19]
Gupte et al.

[11] Patent Number: 5,859,157
[45] Date of Patent: Jan. 12, 1999

[54] PROCESS FOR GAS PHASE POLYMERIZATION OF OLEFINS

[75] Inventors: Kiran M. Gupte, Naperville; Joel A. Mutchler, Morris; Keta M. Lindstrom, Plainfield, all of Ill.

[73] Assignee: Equistar Chemicals, LP, Houston, Tex.

[21] Appl. No.: 731,471

[22] Filed: Oct. 16, 1996

[51] Int. Cl.$^6$ ................................................... C08F 2/34
[52] U.S. Cl. .................... 526/88; 526/128; 526/351; 526/901; 526/905; 526/919; 422/131
[58] Field of Search ................... 526/88, 116, 128, 526/351, 901, 905, 919; 422/131

[56] References Cited

U.S. PATENT DOCUMENTS

| | | | |
|---|---|---|---|
| 2,846,426 | 8/1958 | Larson et al. | 526/159 |
| 2,939,846 | 6/1960 | Gordon et al. | 526/60 |
| 3,405,115 | 10/1968 | Schappert et al. | 526/64 |
| 4,003,712 | 1/1977 | Miller | 526/88 |
| 4,035,560 | 7/1977 | Caumartin et al. | 526/124 |
| 4,302,566 | 11/1981 | Karol et al. | 526/125 |
| 4,665,143 | 5/1987 | Ahluwalia et al. | 526/88 |
| 4,921,919 | 5/1990 | Lin et al. | 526/88 |
| 5,194,531 | 3/1993 | Toda et al. | 526/125 |
| 5,244,989 | 9/1993 | Hara et al. | 526/119 |

*Primary Examiner*—David W. Wu
*Attorney, Agent, or Firm*—Scully, Scott, Murphy & Presser

[57] ABSTRACT

A process for the gas phase polymerization of olefins. In this process a transition metal-containing solid catalyst component is introduced into a cylindrical section of a vertically disposed reactor in a first stream. A second stream, comprising an organometallic cocatalyst component is simultaneously separately introduced into the said cylindrical section of a vertically disposed reactor at a distance from the point of introduction of the first stream of no more than about 20% of the inside diameter of the tubular reactor.

19 Claims, 3 Drawing Sheets

PROCESS FOR GAS PHASE POLYMERIZATION OF OLEFINS

BACKGROUND OF THE DISCLOSURE

1. Field of the Invention

The present invention is directed to a process and apparatus for the gas phase polymerization of olefins. More particularly, the present invention is directed to a process and apparatus for polymerizing at least one olefin monomer in the presence of a catalyst system whose components are separately introduced into a gas phase reactor in close proximity to each other.

2. Background of the Prior Art

Gas phase processes and apparatus for the polymerization of at least one olefin are well known in the art. Among recent processes and apparatus developed for this purpose are systems wherein the catalyst components that constitute the catalyst system utilized in the olefin polymerization are separately introduced into the polymerization reactor.

More specifically, it is known in the art to separately introduce, into a tubular gas phase reactor, a solid catalyst component and a cocatalyst component. That is, a solid catalyst component, which includes at least one transition metal, is introduced into the polymerization reactor separately from the cocatalyst component, which typically is an organometallic compound of a metal of Group 1, 2 or 13 of the Periodic Table. The organometallic compound of the cocatalyst component is preferably a hydrocarbyl-containing compound which includes a metal of Group 1, 12 or 13. More preferably, the cocatalyst component is an alkyl-containing compound which includes at least one of the aforementioned metals. The organometallic compound, which acts as the cocatalyst component, may optionally include halogen or hydrogen atoms and thus be a halide or hydride compound.

These processes and apparatus are specifically designed to provide processing improvements over earlier olefin gas phase polymerization processes and apparatus. None of these recently developed systems, however, have adequately addressed certain well known problems associated with such processes and apparatus. Specifically, although the aforementioned recent developments are designed to eliminate operability problems, such as problems associated with catalyst clumping, which adversely affects operability, i.e. large catalyst particles tend to plug polymerization reactor withdrawal system, such as outlet conduits and the like, these developments have not fully addressed the associated problems of producing polymers having the necessary physical properties to meet specific customer needs.

The most pertinent examples of the prior art, which illustrates gas phase polymerization of olefins wherein the catalyst and the cocatalyst components are separately introduced into the polymerization reactor, include U.S. Pat. No. 2,846,426 to Larson et al. In this process an ethylene gas stream is introduced into liquid titanium tetrachloride. The thereupon vaporized titanium tetrachloride is, in turn, introduced into a polymerization reactor. At the same time, a second ethylene gas stream is introduced into liquid diisobutylaluminum hydride to form a second vaporous composition which is also fed, through a separate inlet, into the same polymerization reactor. A third ethylene gas stream is separately introduced into the reactor. This scheme permits not only gas phase polymerization of ethylene but, in addition, in-situ formation of the catalyst system which catalyzes this polymerization reaction. This processing scheme is alleged, in the '426 patent, to improve control of active catalyst concentration relative to the concentration of the polymerizable ethylene.

U.S. Pat. No. 2,939,846 to Gordon et al. describes a process wherein two separate inert gas streams entrain the vapors of two catalyst components of a Ziegler catalyst system utilized in olefin polymerization reactions. One of the inert gas streams entrains a vapor of a reducing compound, i.e. an aluminum-containing compound. The other inert gas stream entrains a vapor of a salt of a metal of Groups IV to VI of the Periodic Table. A particularly preferred metal of Groups IV to VI, preferred in the '846 patent, is titanium. Also, in a preferred embodiment of the invention of the '846 patent the olefin monomer is used as the entraining gas. The two separate gas streams are intermixed at a temperature at which the reducing compound and the salt of a metal of Groups IV to VI are vaporizable. The olefin monomer is thereupon passed through a point at which the two gaseous streams intermix to form the solid catalyst. In an alternate embodiment, the solid catalyst product is deposited in a polymerization reactor.

U.S. Pat. No. 4,035,560 to Caumartin et al. is directed to a fluidized bed olefin polymerization process wherein a first catalyst component, comprising the solid product of reaction of a transition metal compound and an organomagnesium compound, which may or may not be supported on an inert carrier, is entrained by the upward flow of a gaseous mixture which contains hydrogen and one or more olefin monomers. The thus formed fluidized bed also includes a second catalyst component, an organometallic compound of a metal of Group II or III of the Periodic Table, disposed on an inert porous support separately introduced into the reactor.

U.S. Pat. No. 4,302,566 to Karol et al. sets forth a continuous process for ethylene copolymer production employing a gas phase fluidized bed vertical tubular reactor. A catalyst system is provided by a so-called precursor composition which is the solid reaction product of magnesium chloride and titanium tetrachloride. This "precursor composition" is activated in one of two ways. In the first, the precursor composition is slurried in a solution of the activator compound, triethylaluminum. The thus coated solid particles are thereupon dried and introduced into a vertical disposed tubular reactor downstream of the point of introduction of the monomer or monomers. In addition, supported activator particles, formed by slurrying an inert support in a solution of triethylaluminum followed by the driving off of the solvent, is introduced into the reactor along with the activated precursor composition.

In an alternative embodiment, the triethylaluminum may be introduced in the liquid state by merely introducing a liquid solution of triethylaluminum in an inert hydrocarbon at the same position in the reactor as is the activated precursor solid composition. This second activation embodiment is very similar to the first described activation process except that the solid precursor composition particles and the solid aluminum disposed on an inert support are premixed prior to their introduction together into the reactor.

U.S. Pat. No. 4,665,143 to Ahluwalia et al. sets forth a process for polymerizing olefins in a vertical tubular reactor. An olefin monomer or monomers is introduced into a reactor in a gaseous stream at the upstream, bottom end of the reactor. A first catalyst component, the reaction product of a transition metal compound and a metal alkyl of a metal of Group IA, IIA or IIIB, disposed on an inert support, is introduced downstream of the point of introduction of the monomeric gas stream. A second catalyst component cocatalyst, an aluminum alkyl, is introduced with the olefin monomer into the reactor in an inert hydrocarbon liquid solution above and downstream of the introduction point of the first catalyst component. The distance between the introduction of the first and the second catalyst components is at least two mixing distances. A mixing distance is defined as the distance, measured from the injection point, where only an equilibrium concentration of the introduced substance is present. This mixing distance limitation is said in the '143 patent to insure against the formation of "hot spots," and to minimize "lump" formation.

U.S. Pat. No. 4,921,919 to Lin et al. is directed to a process and apparatus for the polymerization of an olefin monomer, preferably propylene, in a vapor phase tubular horizontal reactor. A titanium-containing first catalyst component is introduced into the top side of the horizontal reactor adjacent to its upstream end. A second and a third catalyst component, i.e. a cocatalyst and a modifier, respectively, are also fed into the top side of the horizontal reactor vessel, downstream of the point of introduction of the first catalyst component. This downstream distance is at least 25% of the internal diameter of the tubular reactor. This minimum distance is needed to minimize formation of polymer lumps.

The above described processes and apparatus of the most pertinent prior art references provide improvements in gas phase olefin polymerization operability. However, these processes and apparatus do not address the need in the art for olefin polymeric products having the desired crystallinity and strength properties required of high strength olefin polymers. Thus, there is still a need in the art for an improved gas phase olefin polymerization process and apparatus which provides not only improved operability but an olefin polymer product having improved physical properties.

BRIEF SUMMARY OF THE INVENTION

A new process and apparatus for the gas phase polymerization of an olefin has now been developed to produce an olefin polymer product having improved physical properties without sacrificing reactor operability.

In accordance with the present invention, a process is provided for polymerizing olefins which comprises polymerizing at least one olefinic monomer under gas phase olefin polymerization conditions in the presence of a catalyst system that includes a transition metal-containing solid catalyst component and an organometallic compound of a metal of Group 1, 2 or 13 of the Periodic Table of the Elements-containing cocatalyst component. The solid catalyst component is introduced into a tubular reactor in a first stream. A second stream, comprising at least one olefinic monomer and the cocatalyst component, is simultaneously introduced into the reactor wherein the first and second streams are separated by a linear distance of no more than about 20% of the inside diameter of the tubular reactor.

In further accordance with the present invention, an apparatus for the gas phase polymerization of an olefin is provided. The apparatus comprises a tubular reactor provided with means for the gas phase polymerization of at least one olefin. Specifically, the reactor includes a first means for the introduction of a first stream of a transition metal-containing solid catalyst component and a second means for the introduction of a second stream of the olefin and a cocatalyst component, the cocatalyst component comprising an organometallic compound of a metal of Group 1, 2 or 13 of the Periodic Table of the Elements. The first and second means are separated by a length no greater than about 20% of the length of the inside diameter of the tubular reactor.

BRIEF DESCRIPTION OF THE DRAWINGS

The present invention will be better understood by reference to the drawings of which.

DETAILED DESCRIPTION

The process and apparatus of the present invention involves polymerization of at least one olefin, under gas phase olefin polymerization conditions, employing a fluidized bed or a stirred bed, in a tubular reactor which may be vertically or horizontally disposed. Polymerization in either of these reactors is described hereinafter.

The gas phase olefin polymerization process and apparatus of the present invention include a catalyst system comprising at least two catalyst components. In a preferred embodiment the catalyst system includes three catalyst components. These catalyst components are separately and simultaneously introduced into the polymerization reactor. Although processes and apparatus are known for the introduction of catalyst components, none of them utilize the novel introduction system employed in the process and apparatus of the present invention.

In the present invention a solid catalyst component is introduced into the reactor in close proximity to the cocatalyst component. Moreover, in a preferred embodiment, where a third catalyst component, a promoter, is employed, the solid catalyst component is introduced into the reactor in close proximity to the cocatalyst and promoter components. Specifically, the solid catalyst component is introduced into a gas phase tubular reactor, whether disposed vertically or horizontally, at a distance from the cocatalyst component, and, in the preferred embodiment wherein a promoter is included, from the point of introduction of the cocatalyst and promoter catalyst components, no further apart than a linear distance equal to about 20% of the length of the inside diameter of the tubular reactor. Preferably, this length is no greater than 10% of the inside diameter of the reactor. More preferably, this distance does not exceed 5% of the length of the inside diameter. Most preferably, the solid catalyst is introduced into the reactor through a central tube which is surrounded by an annular tube. The annular tube provides the means of introduction of the cocatalyst and, if included, the promoter. Thus, in this most preferred embodiment, the catalyst components are introduced separately but in very close proximity to each other.

Figure 1:
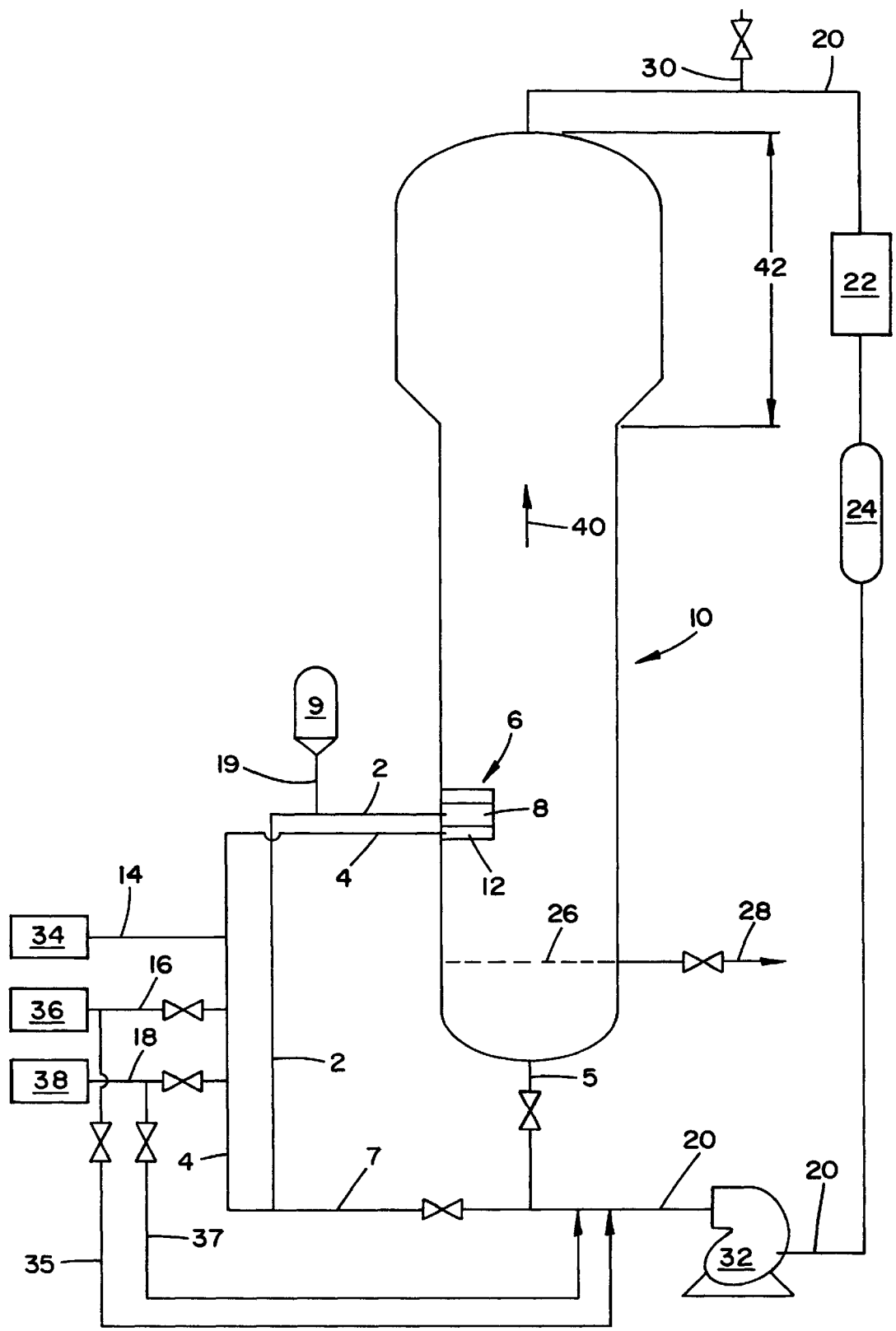
FIG. 1 is a flow diagram of a vertical tubular reactor in which gas phase olefin polymerization in accordance with the process and apparatus of the present invention is practiced.
Figure 2:
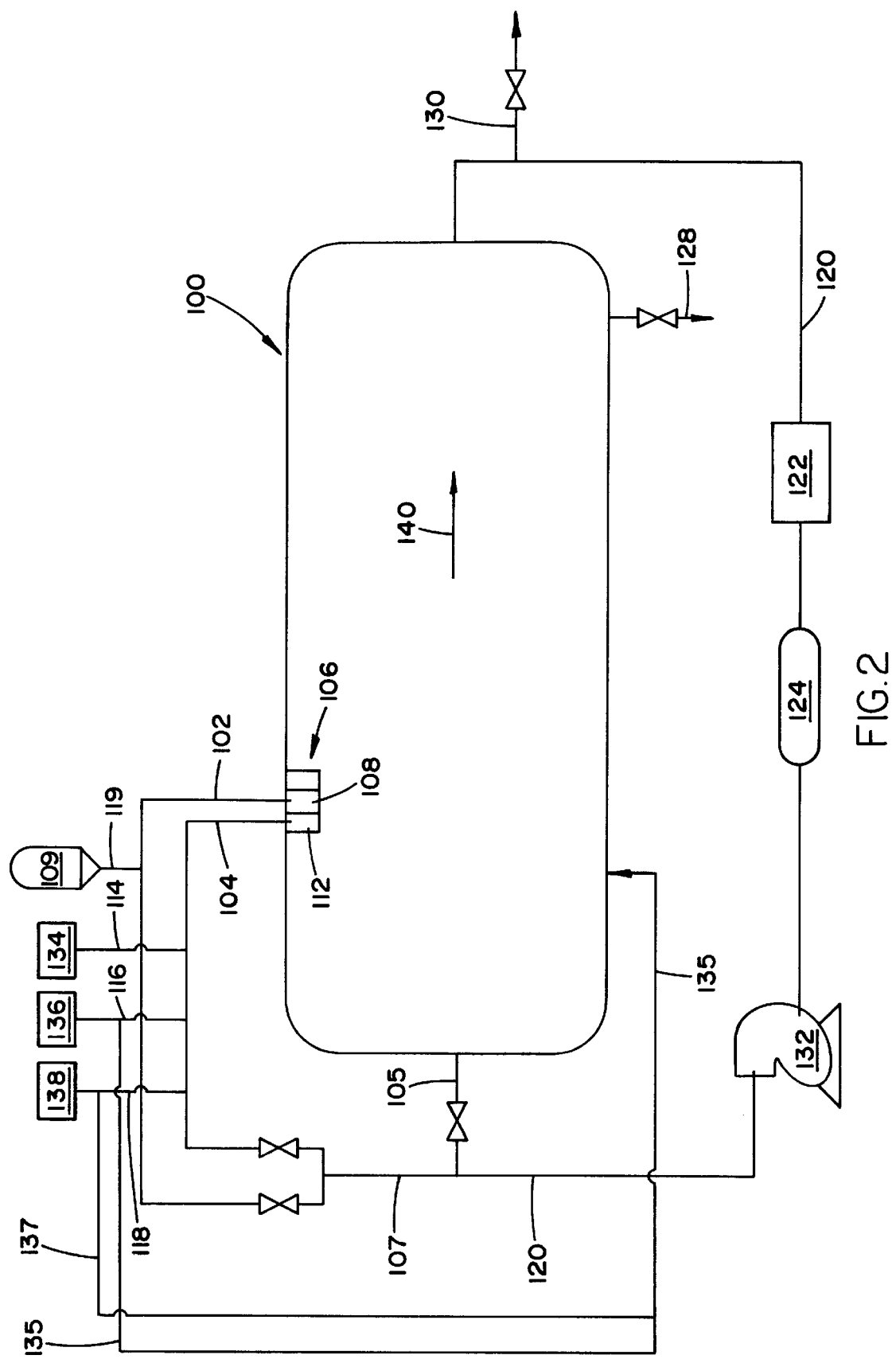
FIG. 2 is a flow diagram of a horizontal tubular reactor in which gas phase olefin polymerization in accordance with the process and apparatus of the present invention is conducted.

This critical element of the process and apparatus of the present invention is illustrated in the drawings. A vertical tubular reactor 10 and a horizontal tubular reactor 100 are depicted in FIGS. 1 and 2, respectively. These depictions are, as stated above, generalized flow diagrams illustrating general principles involved in the gas phase polymerization of olefins of the present invention. Although many aspects of the process and apparatus are illustrated, certain non-critical aspects, such as a quenched liquid feature, which may or may not be included in the gas phase process and apparatus of the present invention, are not described herein.

In the preferred embodiment wherein a vertical tubular reactor is employed, introduction of the catalyst components into tubular reactor 10 is provided by introduction means 6. Introduction means 6, in the preferred embodiment illustrated in FIGS. 1 and 3, includes a central tube 8 surrounded by an annular tube 12. The solid catalyst component, to be discussed below, is introduced into reactor 10 through central tube 8 while the annular tube 12 serves as a mean of ingress of the cocatalyst component and, in the preferred embodiment where a third catalyst component is utilized, the promotor component.

In the preferred embodiment wherein a horizontal tubular reactor is utilized, a similar scheme is utilized for the introduction of the catalyst system which comprises at least two catalyst components. That is, an introduction means 106 is provided which includes a central tube 108 and an annular tube 112 for introduction of the two or three catalyst components into horizontal reactor 100.

It is emphasized that the present invention is not limited to the preferred embodiment wherein a central and an annular tube are utilized to provide means of introduction of the catalyst components of the olefin polymerization catalyst system. This preferred embodiment merely provides a convenient and economical method of introducing the catalyst components within the scope of the present invention. Thus, adjacent introductory means or any other arrangement to introduce the catalyst components into the reactor is within the contemplation of the present invention, with the proviso that the distance between the point of introduction of the solid catalyst component and the cocatalyst component is not further apart than a linear distance equal to about 20% of the inside diameter of the tubular reactor, whether disposed vertically or horizontally. Of course, an embodiment wherein this length is no more than about 10% of the inside diameter and an embodiment wherein this length is no longer than about 5% of the inside diameter are, respectively, preferred and more preferred.

It is well known in the art that olefin polymerization catalyst systems usually include at least two components. The first catalyst component is usually a solid catalyst component which includes at least one transition metal therein. Although the solid catalyst component of the olefin polymerization catalyst system can include one or more transition metals, i.e. metals of Groups 4, 5, 6, 7, 8, 9 and 10 of the Periodic Table of the Elements, it is preferred that the transition metal include one or more metals of Groups 4, 5 and chromium. Of these, it is particularly preferred that the solid catalyst component include titanium.

The present invention is, of course, not limited to the specific identity or means of preparation of the solid catalyst component, provided the solid catalyst component includes at least one transition metal. Additionally, solid catalyst components which are supported or unsupported are within the scope of the present invention. A catalyst support is an inert organic or inorganic species. Preferred examples of catalyst supports include inert inorganic oxides such as silica, alumina, magnesia, silica-alumina, zirconia and the like. Of these, silica is particularly preferred.

The solid catalyst component can include other components well known in the art. For example, a second metal selected from the group consisting of metals of Groups 1, 2 and 13 of the Periodic Table may be included. Of these metals, magnesium and aluminum are preferred, with magnesium being particularly preferred. In addition, the solid catalyst component may include an electron donor compound.

The specific composition of the solid catalyst component is usually dictated by the specific identity of the olefin or olefins to be polymerized and the desired properties of the product polyolefin. For example, in the preferred embodiment wherein propylene is polymerized to produce a crystalline polypropylene product, it is particularly preferred that the transition metal included in the solid catalyst component be titanium alone or in combination with other transition metals. In that preferred embodiment wherein propylene is polymerized it is similarly preferred that magnesium be included in the solid catalyst component.

A particularly preferred class of solid catalyst components is disclosed in U.S. Pat. Nos. 4,950,631; 5,098,969; 5,143,883; 5,145,821; 5,221,650; 5,232,998 and 5,275,991 which disclosures are incorporated herein by reference. These disclosures all describe a solid catalyst component supported on silica which incorporates therein titanium and magnesium metal species.

The cocatalyst component of the olefin polymerization catalyst system of the present invention acts as an activator for the solid catalyst component. Preferred cocatalyst components within the scope of this invention include organometallic compounds where the metal is a member of Group 1, 2, 12 and 13 of the Periodic Table of the Elements. Even more preferably, the cocatalyst is an organometallic compound wherein the metal is a member of Group 2, 12 or 13. More preferably, the organometallic compound is an organic compound which includes one or more metals selected from the group consisting of aluminum, magnesium, zinc or boron. Of these, aluminum is particularly preferred.

The organometallic compound constituting the catalyst component is preferably a hydrocarbyl-containing compound which includes a metal limited to those defined in the above paragraph. More preferably, the cocatalyst component is an alkyl-containing compound which includes at least one of the aforementioned metals.

The above discussed organometallic compound, which acts as the cocatalyst component, may optionally include halogen or hydrogen atoms and thus be a halide or hydride compound. Thus, particularly preferred cocatalyst components are such aluminum compounds as triethylaluminum, triisobutylaluminum, ethylaluminum dichloride, diethylaluminum chloride, ethylaluminum sesquichloride, diisobutylaluminum hydride, mixtures thereof and the like. Of these, triethylaluminum is particularly preferred for use as the cocatalyst component.

As stated above, in a preferred embodiment of the process and apparatus of the present invention the olefin polymerization catalyst system includes a third component, a promoter. Promoter compounds are usually organic electron donor compounds which include organic esters, organic acid anhydrides, organic acid esters, alcohols, ethers, aldehydes, ketones, silanes, amines, amine oxides, amides, thiols, phosphorus acid esters and phosphorus acid amides. Mixtures of two or more organic electron donors are also within the contemplation of this invention.

Of the promoters within the contemplation of this invention, organic acids, organic acid esters and silanes are particularly preferred. Examples of preferred organic acids and organic acid esters are benzoic acid, halobenzoic acid, phthalic acid, isophthalic acid, terephthalic acid, methyl benzoate, ethyl benzoate, butyl benzoate, isobutyl benzoate, methyl bromobenzoate, ethyl chlorobenzoate and the like.

Among the silanes preferred for use in the present invention are hydrocarbylhydrocarbyloxysilanes, hydrocarbylsilanes and hydrocarbyloxysilanes having the structural formula $Si(OR^1)_{4-p}(R^2)_p$, where $R^1$ is the same or different and is hydrocarbyl; $R^2$ is the same or different and is hydrocarbyl; and p is 0 or an integer of 1 to 4. It is particularly preferred that the hydrocarbyl radicals, i.e. $R^1$ and $R^2$, be alkyl groups and that p be an integer of 1 to 3. Thus, alkylalkoxysilanes are particularly preferred embodiments of promoters within the scope of the present invention. For example, silanes such as diisopropyldimethoxysilane, isobutyltrimethoxysilane, isobutylisopropyldimethoxysilane and the like are particularly preferred for use as the promotor component of the catalyst system of the process and apparatus of the present invention.

The above discussion of the olefin polymerization catalyst system does not distinguish between so-called Ziegler-Natta olefin polymerization catalyst systems, well established in the art, and more recently developed metallocene olefin polymerization catalyst systems. Both systems utilize a solid catalyst component containing at least one transition metal, albeit in the case of metallocene solid catalyst components the transition metal of choice may be zirconium, or, less preferably, hafnium, as well as titanium. Both systems additionally provide an organometallic compound albeit, in the case of metallocene catalyst systems, the organometallic compound usually includes oxygen. For example, aluminoxanes are preferably employed.

Metallocene solid catalyst components are transition metal-containing compounds which include at least one substituted or unsubstituted cyclopentadienyl ring bonded to the transition metal atom. Metallocene compounds have been the subject of many publications and their identity is well known to those skilled in the art.

Turning to the introduction of the reactant mixture into either vertical disposed reactor having a cylindrical section 10 or horizontal tubular reactor 100 the solid catalyst component is introduced through conduit 2 or 102, respectively. Conduit 2 or 102 is in communication with an inlet means, which in the particularly preferred embodiment of the present invention is illustrated by reactor inlet means 6 or 106. Specifically, conduit 2 or 102 is in communication with central tube 8 or 108 of inlet means 6 or 106. Similarly, the cocatalyst component and, in the preferred embodiment wherein a promoter is included, the promoter catalyst component, are introduced into reactor 10 or 100 through conduit 4 or 104 which is in communication with annular tube 12 or 112 of inlet means 6 or 106.

Other components are also introduced into reactors 10 or 100 through conduit 4 or 104. In the preferred embodiment wherein a promotor catalyst component is included in the olefin polymerization catalyst system, it is introduced into conduit 4 or 104 through conduit 14 or 114, respectively, from a source denoted in the drawings as 34 or 134, respectively. The promotor, in one preferred embodiment, is introduced into the reactor separately from the cocatalyst. In another preferred embodiment, the cocatalyst and the promotor compounds are premixed and are introduced into the reactor as a single composition. That is, source 34 or 134 may represent two separate components or a single composition. Independent of whether two separate compounds or a composition of two compounds are supplied through conduit 14 or 114 into conduit 4 or 104, it is preferred that the cocatalyst and promotor compounds, separately or together as a composition, be introduced in a solution of an inert hydrocarbon solvent.

A second introductory conduit is depicted at 16 or 116. Conduit 16 or 116 provides means for ingress of one or more olefin monomers into conduit 4 or 104 and thereupon into reactor 10 or 100. That is, the olefin monomer or monomers to be polymerized, provided by source 36 or 136, can be introduced through conduit 16 or 116.

Although olefin monomer can be introduced into the reactor through conduit 16 or 116, it is not feasible to introduce the large volume of fresh feed required in commercial continuous operation through this relatively small tube. Thus, a conduit 35 or 135 provides communication for alternate introduction of fresh monomer feed.

The olefin monomer or monomers which may be introduced into conduit 35 or 135 can be fed into the tubular polymerization reactor independently or can be combined with recycle monomeric feed discussed below. The embodiment wherein all or a portion of the monomeric feed is introduced along with a recycle stream is illustrated in the depiction of the vertical reactor of FIG. 1. Therein, conduit 35 is in downstream communication with conduit 20 wherein the olefin is introduced into the reactor along with recycle olefin monomer through conduit 5.

The preferred embodiment wherein all or some of the fresh olefin monomeric feed is independently introduced into the reactor other than through conduit 16 or 116 is depicted in the horizontal reactor of FIG. 2. Therein, conduit 135 communicates directly between conduit 116 at its upstream end and the interior of the reactor 100 at its downstream end. This arrangement provides independent introduction of fresh olefin monomer or monomers at the upstream end of the reactor. It should be appreciated that although FIG. 2 depicts a single point of introduction, a manifold may be utilized to insure introduction of the monomer over a wide length of the upstream end of reactor 100.

Preferably, the olefin or olefin monomers are α-olefins. More preferably, the α-olefin monomer or monomers contain 2 to about 12 carbon atoms. Still more preferably, one or more α-olefin monomers containing 2 to about 8 carbon atoms are provided. Even more preferably, the olefin monomer is ethylene or propylene alone, in combination with each other or in combination with one or more higher α-olefins containing 4 to 8 carbon atoms.

Conduit 18 or 118 illustrates the means of communication of a source of hydrogen gas, depicted in the drawings at 38 or 138. Conduit 18 or 118 is in communication with conduit 4 or 104 as well as conduit 37 or 137. As those skilled in the art are aware, hydrogen gas acts as a chain-transfer agent to adjust the molecular weight of the polymer product. Hydrogen gas also serves to enhance reactivity of low reactive monomers in embodiments wherein copolymers are polymerized. Of significance, the greater the concentration of hydrogen employed in the polymerization reaction, the lower will be the molecular weight of the polymer product. For these reasons, it is preferred to include hydrogen in the gas phase olefin polymerization process and apparatus of this invention. The exact concentration of hydrogen gas, as measured by % volume, based on the total volume of the olefin and hydrogen gases introduced into the reactor, is a function of the desired polymer molecular weight.

It is emphasized, however, that the inclusion of hydrogen gas, in the gas phase olefin polymerization process and apparatus of this invention, is not essential and thus may be omitted without disturbing the process and apparatus constituting the present invention.

As in the case of the olefin monomer or monomers, the introduction point of the hydrogen gas is optional. That is, it may be introduced into the tubular reactor though conduit 4 or 104 in communication with the downstream end of conduit 18 or 118 along with the cocatalyst and, if present, the promoter. Alternatively, the hydrogen gas can be introduced separately into the reactor by being conducted through conduit 37 or 137, wherein it may be introduced with the olefin monomer or monomers as discussed in the description of the introduction of the olefin monomer, or it can be split and partially introduced along with the cocatalyst and partially independently introduced with the monomer through a separate ingress means or through the recycle conduit.

It should be emphasized that in the case where the hydrogen gas is independently introduced into the reactor with olefin monomer it is preferred that conduit 137 merge into conduit 135, which conveys the monomer resulting in a combined stream of monomer and hydrogen gas fed into the reactor through conduit 135.

The gas phase olefin polymerization process and apparatus of this invention, depicted in FIGS. 1 and 2, includes a commonly employed recycle system. As stated above, the olefin or olefins is introduced into the vertical and horizontal reactor, respectively through annular orifice 12 or 112 which is in upstream communication with conduit 4 or 104. That stream includes, in addition to the olefin monomer or monomers, a cocatalyst, both a cocatalyst and a promoter or a composition comprising a premixed cocatalyst and promoter. The aforementioned stream is fed into conduit 4 or 104 through feeding conduit 16 or 116. In addition, the stream flowing in conduit 4 or 104 may include, in a preferred embodiment, hydrogen gas. The hydrogen gas, provided at 38 or 138, is supplied to conduit 4 or 104 by conduit 18 or 118.

The solid catalyst component is stored in an enclosed storage vessel 9 or 109 in communication with conduit 2 or 102, by conduit 19 or 119, which, as indicated earlier, is in downstream communication with central tube 8 or 108. Fluidization of the solid catalyst component is provided by a stream of an inert gas, preferably nitrogen, which is provided at a rate such that the desired mass rate of fresh catalyst component is provided into the vertical or horizontal tubular reactor 10 or 100.

The monomer or monomers, the catalyst components and the modifying agent, if present, enter reactor 10 or 100 and move toward the downstream end of the reactor as depicted in the drawing by arrow 40 or 140. This two-phase solid-gas flow is primarily provided by the recycle gas stream emanating from the upstream end of the reactor as discussed below.

Gas flow in reactor 10 or 100 moves downstream until it exits the reactor at its downstream end through conduit 20 or 120. That only gas, and not solid particles, leaves reactor 10 or 100 is aided by the optional inclusion of a gas velocity reduction zone. Such a zone is illustrated in vertical reactor 10 by reduction zone 42. This zone is characterized by a wider diameter than the remainder of the tubular reactor. This wider diameter reduces gas stream velocity. As gas stream momentum decreases, the higher density solid particles fall downward in the upstream direction.

The unreacted gas stream exiting the downstream end of reactor 10 or 100 is conveyed through recycle conduit 20 or 120. A purge line 30 or 130, in communication with conduit 20 or 120, is provided to sample the gas stream to determine its constituency. Purge line 30 or 130 also serves to eliminate inert gases, such as vaporized hydrocarbon solvents, which would otherwise build up in the system. These gases may be flared or repurified for reuse.

The gas in conduit 20 or 120 may be filtered by filter 22 or 122 to remove small particles that are entrained by the gas stream exiting the downstream end of the reactor. Although very little solid entrainment is encountered, even a small concentration of solids may adversely affect the operation of the heat exchanger and compression means disposed further downstream in conduit 20 or 120.

The gas stream, after optional filtering, is cooled in a heat exchanger 24 or 124. The gas stream flowing in conduit 20 or 120 is at elevated temperature due to the heat generated in the polymerization reaction. By removing this heat of polymerization reaction, the gas stream in conduit 20 or 120, upon recycle into reactor 10 or 100, does not increase the temperature therein.

The cooled gas stream in conduit 20 or 120 is then compressed by compressor 32 or 132 and recycled, by means of conduit 5 or 105, into the upstream end of reactor 10 or 100. The recycle gas stream is substantially all unreacted olefin monomer. The gas stream enters the upstream end of reactor 20 or 120 and moves downstream. In the case of a vertical disposed reactor, the gas stream passes through a distribution plate 26. Distribution plate 26, may be a screen, a slotted plate, a perforated plate, a bubble cap plate or the like. Plate 26 permits gaseous flow therethrough but does not permit flow of solid particles. Thus, catalyst particles and solid polymer product are prevented from plugging the upstream entrance of the recycle stream by stopping the upstream flow of solids on the top, downstream surface of plate 26.

More importantly, the distribution plate 26 prevents formation of a quiescent mass during polymerization. Such a condition results in the formation of a solid block due to the active condition of the hot polymer particles in contact with active catalyst particles. The recycle gas stream entering the reactor through conduit 5 is diffused through distribution plate 26 to keep the particles above the plate 26 fluidized. It should, of course, be appreciated, on the other hand, that the distribution plate 26, serves as a base for the formation of a quiescent bed of polymer and catalyst when the reactor 10 is not in operation.

As discussed above, virgin monomer, the catalyst system and hydrogen, if present, are introduced into the reactor 10 or 100 downstream of the upstream end where the recycle gas stream is introduced. The point of introduction of inlet means 6 or 106 is indeed significantly downstream of the point of introduction of the recycle stream. This arrangement insures that polymerization occurs downstream of the distribution plate 26, thus preventing recycle gas entry plugging. Moreover, this downstream point of introduction aids in preventing the formation of localized "hot spots" caused by localized concentration of catalyst. That is, introduction of catalyst components into the fluidized portion of the reactor insures good distribution of those components. The above description infers that most of the monomeric reactant is provided by the recycle stream introduced through conduit 5 or 105.

The olefin polymeric product is removed by product take off conduit 28 or 128. In the preferred embodiment wherein the tubular reactor is disposed vertically, i.e. reactor 10, the take off conduit is preferably situated at the surface of the distribution plate. In the preferred embodiment wherein a horizontally disposed reactor, i.e. reactor 100, is employed the take off conduit 128 is preferably placed at its bottom at the downstream end.

The reactor 10 or 100, and thus the polymerization reaction, is maintained at a temperature in the range of from about 0° C. to about 120° C. and at a pressure of about 20 psi to about 600 psi. Preferably, the thermodynamic conditions in the polymerization reactor 10 or 100 include a temperature in the range of between about 20° C. and about 100° C. and a pressure in the range of between about 100 psi and about 500 psi. More preferably, the thermodynamic conditions in the reactor 10 or 100 is a temperature of between about 50° C. and about 90° C. and a pressure of about 200 psi and about 450 psi.

The rate of downstream gas velocity in reactor 10 or 100, in order to maintain the desired fluidization bed polymerization conditions, is in the range of between about 1.0 ft/sec and about 3.0 ft/sec. More preferably, the fluidized bed is maintained at a velocity of between about 1.5 ft/sec and about 2.5 ft/sec.

The following examples are given to illustrate the scope of the present invention. Because these examples are given for illustrative purposes only, the invention should not be deemed limited thereto.

EXAMPLE 1

Polymerization of Propylene in a Tubular Vertical Reactor Using a Catalyst System Where the Solid Catalyst Components and Promotor are Introduced in Close Proximity A supported catalyst component was prepared in accordance with the teaching of U.S. Pat. No. 4,950,631, which teaching is incorporated herein by reference. Thus, the solid catalyst component comprised a catalytic agent which included titanium and magnesium disposed on a silica support.

This solid catalyst component was introduced into a vertical tubular reactor of the type depicted in FIG. 1. The solid component was introduced through a central tube, as depicted at 8, having a diameter of ¼ inch, of an introductory means of the type depicted at 6. The solid catalyst component was introduced at a rate of 9.6 gms/hr entrained by a stream of nitrogen gas. This rate was selected to insure that about 100 lb/hr of polymeric product was produced. The central tube 8 was disposed 2 feet above the distribution plate, depicted at 26. The vertical reactor itself had an inside diameter, in the fluidized bed portion wherein polymerization occurs, i.e. below the reduced velocity section 42, of 19 inches and was 12 ft high.

Figure 3A:
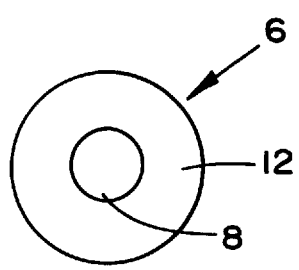
FIGS. 3a and 3b are top and front views of a preferred embodiment of a means of introducing catalyst components into a vertically disposed tubular gas phase olefin polymerization reactor.
Figure 3B:
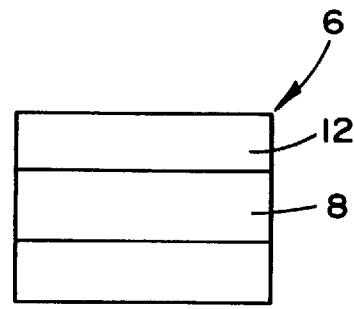
Figure 4A:
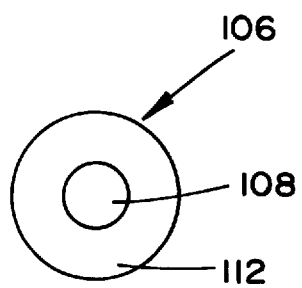
FIGS. 4a and 4b are top and front views of a preferred embodiment of a means of introducing catalyst components into a horizontally disposed tubular gas phase olefin polymerization reactor.
Figure 4B:
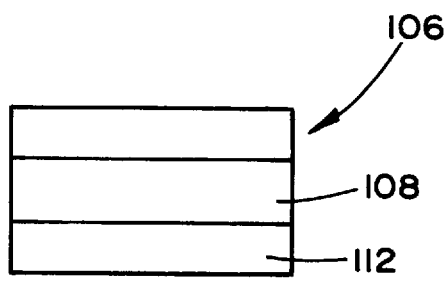

Introductory means 6 included an annular tube of the type illustrated in FIGS. 1 and 3 by tube 12. Propylene, hydrogen gas, triethylaluminum (TEAL) and diisopropyldimethoxysilane (DIPS) were introduced into a reactor of the type illustrated at 10 through annular tube 12.

The vertical reactor 10 was maintained at a temperature of 180° F. (82° C.) and a pressure of 400 psig. The recycle stream was maintained at a rate sufficient to provide a fluidized bed linear velocity of 1.5 ft/sec wherein the gas stream entering through conduit 5, as analyzed at take off line 30, was 80 mole % propylene and 0.65 mole % hydrogen, the remainder being nitrogen. The catalyst components were introduced into reactor 10 such that the molar ratio of Al:Si:Ti of the catalyst system was 30:8:1. The polypropylene was taken off through line 28. The polymerization reaction was continuously run for a period of approximately 2.1 hours.

The above conditions were designed to not only provide about 100 lbs/hr of the polypropylene product but also to produce a product which had a degree of polymerization such that its melt flow rate was about 18. It is emphasized that no polymer agglomeration was noticed using the duration of the polymerization run.

The polypropylene product was analyzed and the results of this analysis as well as the operating conditions of this example are summarized in Table 1.

EXAMPLES 2–4

Propylene Polymerization Utilizing Higher Concentrations of Aluminum

Example 1 was identically reproduced in Examples 2–4 but for the increase in the concentration of the TEAL feed into the reactor and the corresponding decrease in the hydrogen gas concentration. These changes canceled each other out to the extent that the nominal melt flow rate of the polypropylene product remained at about 18.

In Example 2, this increased TEAL fed rate resulted in a Al:Si:Ti molar ratio of 40:8:1. In Example 3 this catalyst system molar ratio was further increased to 80:8:1 and in Example 4 the Al:Si:Ti molar ratio was further elevated to 120:8:1. It is emphasized that Examples 2–4 were otherwise identical with Example 1. Thus, the only distinction among Examples 1 to 4 was the increased concentration of TEAL and decreased concentration of hydrogen gas introduced into the annular tube.

The results of these examples are included in Table 1. It is again noted that no polymer agglomeration was observed.

COMPARATIVE EXAMPLES 1–4

Preparation of Propylene in Traditional Gas Phase Reactor

Examples 1–4 were identically reproduced in all regards at Comparative Examples 1–4, respectively but for the point of introduction of the cocatalyst, TEAL and the promoter, DIPS. Whereas TEAL and DIPS were introduced into the reactor through annular orifice 12 in Examples 1–4, in Comparative Examples 1–4 TEAL and DIPS were introduced through a conduit in communication with conduit 5, in accordance with prior art cyclic gas concepts.

The results of these runs are included in Table 1.

TABLE 1

| Example No | Al:Si:Ti Molar Ratio | DIPS Feed Location | Flexural Modulus[1] | % HI |
|---|---|---|---|---|
| 1 | 30:8:1 | Annular | 221,900 | 97.2 |
| CE1 | 30:8:1 | Cycle Gas | 177,500 | 92.4 |
| 2 | 40:8:1 | Annular | 218,400 | 96.9 |
| CE2 | 40:8:1 | Cycle Gas | 180,500 | 92.6 |
| 3 | 80:8:1 | Annular | 162,700 | 90.5 |
| CE3 | 80:8:1 | Cycle Gas | 172,000 | 91.3 |
| 4 | 120:8:1 | Annular | 159,500 | 89.7 |
| CE4 | 120:8:1 | Cycle Gas | 165,000 | — |

[1]As determined by ASTM Test Procedure D-790.

DISCUSSION OF RESULTS OF TABLE 1

The benefits of the present invention are defined in the data included in Table 1. Attention is particularly directed to Examples 1 and 2 which were run at the commercially important catalyst system molar ratios of Al:Si:Ti of 30:8:1 and 40:8:1. These runs, when compared to Comparative Examples 1 and 2, were identical but for the addition of the cocatalyst and promoter through an annular tube in Examples 1 and 2 and the introduction of the cocatalyst and promoter through recycle inlet 5 in Comparative Examples 1 and 2.

Since all four runs utilized central tube 8 to introduce the solid catalyst component, Examples 1 and 2 illustrated the invention insofar as the linear distance between the solid catalyst component stream flowing through central tube 8 and the cocatalyst and promoter flowing through annular tube 12 is less than 5% of the diameter of the reactor. On the other hand, Comparative Examples 1 and 2 demonstrate the prior art cycle gas process wherein the linear distance between central tube 5, the entry point of the solid catalyst component, and conduit 5 is far in excess of 20% of the reactor diameter.

In all four runs, no polymer agglomeration was noticed. Thus, a perceived problem associated with close introduction of catalyst components is rebutted. Moreover, the product improvement of Examples 1 and 2, compared to Comparative Examples 1 and 2, in terms of significantly improved flexural modulus establishes the advance in the art of the present invention. It should also be appreciated that % heptane insolubility, a measure of the crystallinity of the product polypropylene, is appreciably increased when produced in accordance to this invention. Those skilled in the art are aware that flexural modulus is an established funtion of polymer crystallinity.

It is conceded that at higher aluminum to titanium molar ratios, this trend was reversed. However, as indicated by the data in Table 1, commercial operation of gas phase reactors utilizes lower molar ratios of aluminum to titanium insofar as these lower ratios produce higher flexural modulus, independent of the location of the introduction of the catalyst components of the catalyst system. Indeed, a comparison between Comparative Example 2 and Comparative Example 3 illustrate this point. In Comparative Example 2, utilizing an aluminum to titanium molar ratio of 40:1, the flexural modulus was 180,500 psi. At the higher aluminum to titanium molar ratio of 80:1, this flexural modulus was reduced to 172,000 psi. Thus, commercial operation of a gas phase propylene polymerization process and apparatus utilizes a catalyst system, independent of the method of its introduction in which relative low aluminum to titanium molar ratios are employed. At the commercially significant aluminum to titanium molar ratios, the significant improvement of utilizing a catalyst system wherein the catalyst components are introduced in closer proximity to each other than in the prior art produces significantly improved polymers.

The above preferred embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process of polymerizing olefins comprising polymerizing at least one olefin monomer under gas phase polymerization conditions in the presence of a catalyst system that includes a solid catalyst component, said solid catalyst component including a transition metal, said transition metal being a metal of Group 4 of the Periodic Table, a metal of Group 5 of the Periodic Table, chromium or mixtures thereof, and a cocatalyst component which is an organometallic compound of a metal of Group 1, 2, 12 or 13 of the Periodic Table, wherein said metal of said organometallic compound and said transition metal of said solid catalyst component are present in said catalyst system in a molar ratio of between about 30:1 to about 40:1, said solid catalyst component introduced into a cylindrical section of a vertically disposed reactor in a first stream and said cocatalyst component introduced into said cylindrical section of said vertically disposed reactor in a second stream, said second stream optionally including at least one olefin monomer, said first and said second streams simultaneously separately introduced into said reactor by a linear distance of no more than about 10% of the inside diameter of said cylindrical section of said vertically disposed reactor.

2. A process in accordance with claim 1 wherein said catalyst system includes an electron donor-containing promoter catalyst component introduced into said polymerization reactor in said second stream.

3. A process in accordance with claim 2 wherein said cocatalyst component and said promoter component are introduced into said reactor in said second stream as a premixed composition.

4. A process in accordance with claim 2 wherein said second stream optionally includes hydrogen gas.

5. A process in accordance with claim 3 wherein said second stream optionally includes hydrogen gas.

6. A process in accordance with claim 1 wherein said second stream optionally includes hydrogen gas.

7. A process in accordance with claim 2 wherein said promoter is selected from the group consisting of organic acids, organic acid anhydrides, organic acid esters, alcohols, ethers, aldehydes, ketones, silanes, amines, amine oxides, amides, thiols, phosphoric acid esters, phosphoric acid amides and mixtures thereof.

8. A process in accordance with claim 7 wherein said promoter is a silane.

9. A process in accordance with claim 8 wherein said silane has the structural formula $Si(OR^1)_{4-p}(R^2)_p$ where $R^1$ is the same or different and is hydrocarbyl; $R^2$ is the same or different and is hydrocarbyl; and p is 0 or an integer of 1 to 4.

10. A process in accordance with claim 9 wherein $R^1$ is the same or different and is $C_1$–$C_8$ hydrocarbyl; and $R^2$ is the same or different and is $C_1$–$C_8$ hydrocarbyl.

11. A process in accordance with claim 10 wherein $R^1$ is the same or different and is $C_1$–$C_8$ alkyl; $R^2$ is the same or different and is $C_1$–$C_8$ alkyl; and p is an integer of 1 to 3.

12. A process in accordance with claim 1 wherein said linear distance is no more than about 5% of the inside diameter of said cylindrical section of said vertically disposed reactor.

13. A process in accordance with claim 12 wherein said first and said second streams are introduced into said reactor through a central tube and an annular tube surrounding said central tube, respectively.

14. A process in accordance with claim 13 wherein said olefin monomer is an α-olefin containing 2 to about 10 carbon atoms.

15. A process in accordance with claim 14 wherein said transition metal included in said solid catalyst component is selected from the group consisting of titanium, vanadium, zirconium, chromium and mixtures thereof.

16. A process in accordance with claim 1 wherein said metal of said organometallic compound is a metal of Group 13.

17. A process in accordance with claim 1 wherein said transition metal of said solid catalyst component of said first stream is titanium and said α-olefin is propylene.

18. A process in accordance with claim 17 wherein said solid catalyst component includes magnesium and is supported on an inert inorganic oxide.

19. A process in accordance with claim 18 wherein said metal of said organometallic compound is aluminum.

* * * * *